Sept. 6, 1955
C. R. LEIGHTON ET AL
2,717,077
MACHINE FOR SEPARATING STONES, POTATOES, AND VINES
Filed Aug. 2, 1951
3 Sheets-Sheet 1
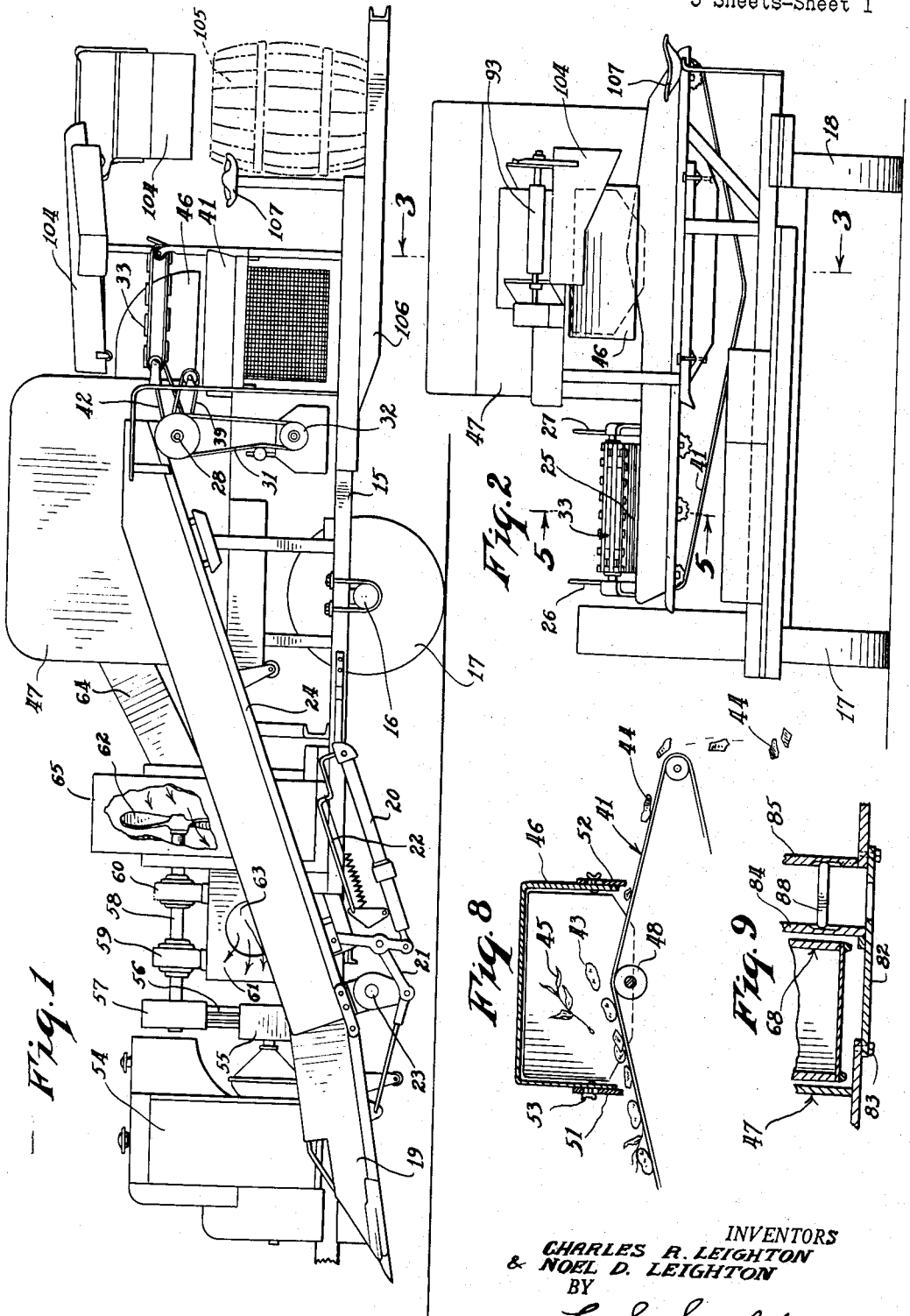
INVENTORS
CHARLES R. LEIGHTON
& NOEL D. LEIGHTON
BY
L. S. Saulsbury
ATTORNEY Sept. 6, 1955  C. R. LEIGHTON ET AL  2,717,077
MACHINE FOR SEPARATING STONES, POTATOES, AND VINES
Filed Aug. 2, 1951  3 Sheets-Sheet 2
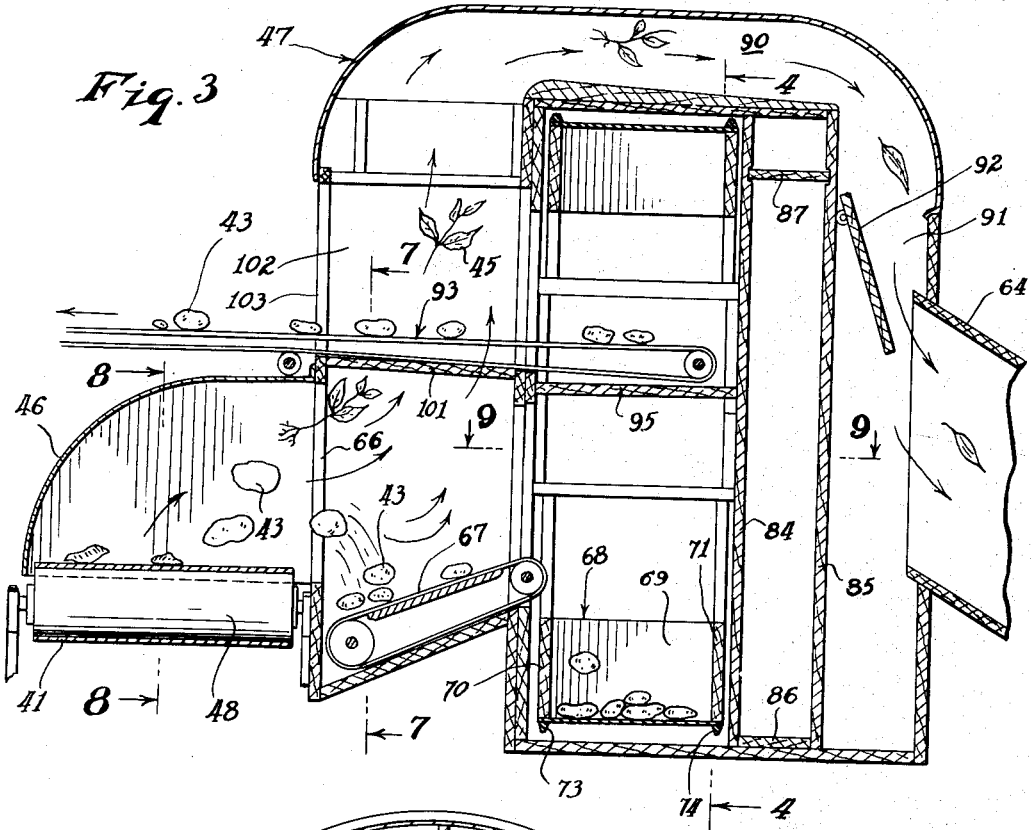
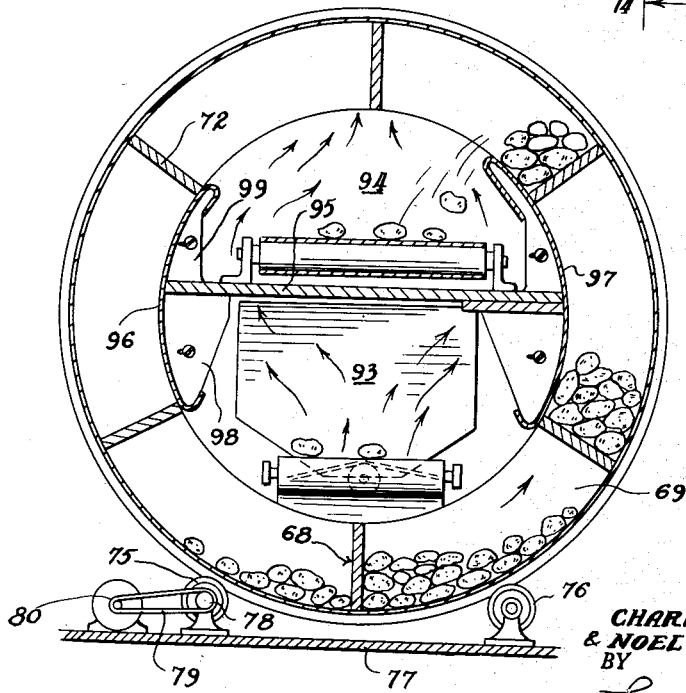
INVENTORS
CHARLES R. LEIGHTON
& NOEL D. LEIGHTON
BY
L. S. Saulsbury
ATTORNEY Sept. 6, 1955 C. R. LEIGHTON ET AL 2,717,077
MACHINE FOR SEPARATING STONES, POTATOES, AND VINES
Filed Aug. 2, 1951 3 Sheets-Sheet 3
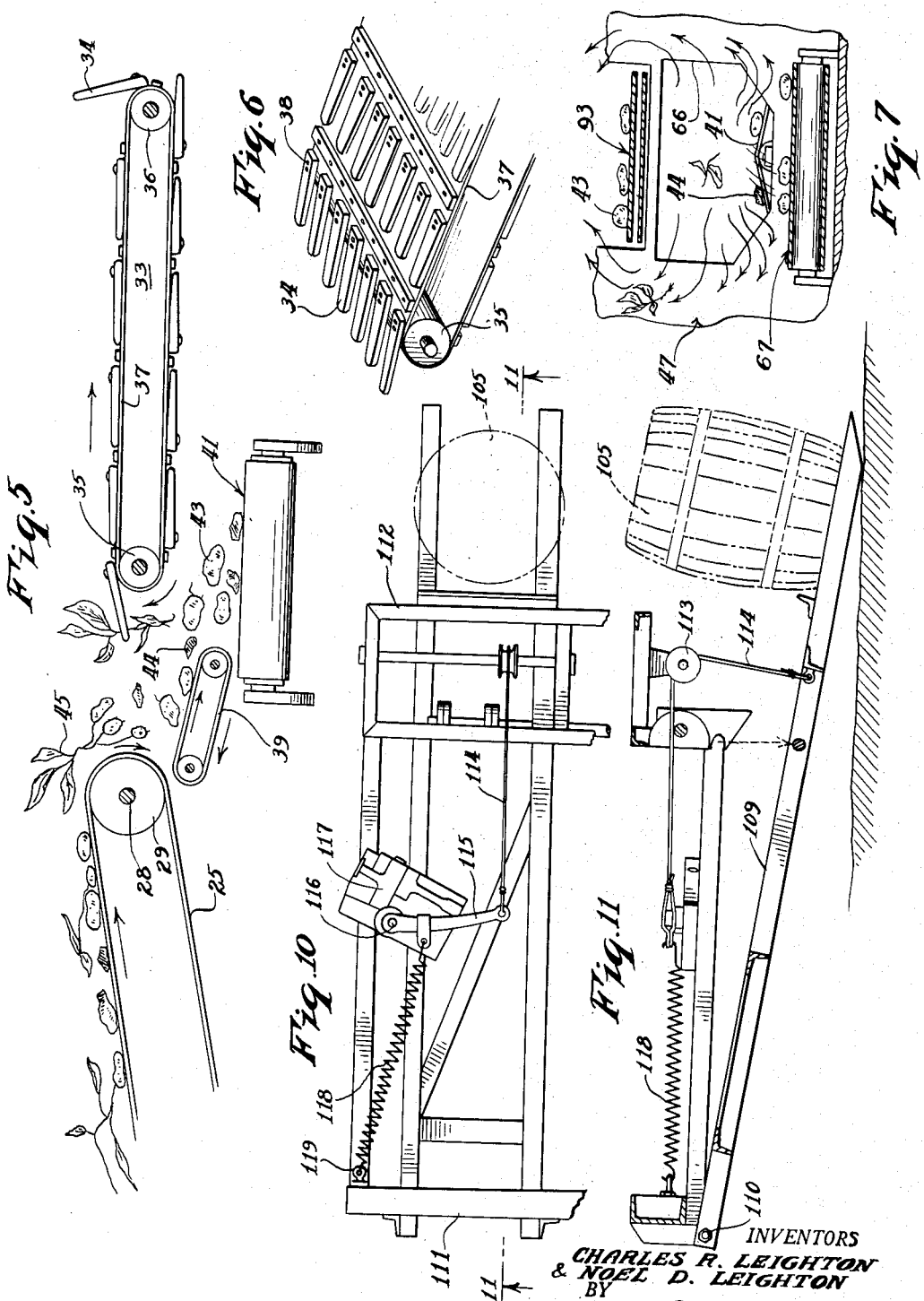

United States Patent Office 2,717,077
Patented Sept. 6, 1955

2,717,077

MACHINE FOR SEPARATING STONES, POTATOES, AND VINES

Charles R. Leighton and Noel D. Leighton, Limestone, Maine

Application August 2, 1951, Serial No. 239,958

6 Claims. (Cl. 209—139)

This invention relates to a potato harvesting machine.

It is an object of the present invention to provide a potato harvesting machine adapted to harvest potatoes in a field containing rocks and stones wherein the stones will, upon passing through the machine, be made free of the potatoes and the potatoes collected and put in barrels on the machine, the barrels thereafter being dropped to the ground as they are filled and picked up with a truck.

It is another object of the invention to eliminate the back breaking job of picking up potatoes from the ground to fill the barrels and to thereby eliminate the need for mass labor during potato harvesting time.

It is another object of the invention to provide a unit for a potato harvesting machine which will effectively remove potatoes from a belt over which potatoes and stones may be travelling and by the medium of air suction and in such a manner as to give the potatoes only the slightest number of bruises.

It is another object of the invention to provide in a potato harvesting machine where potatoes are gathered with the vines a finger type arrangement adapted to keep itself free of the vines that are removed from the conveyor by it and to kick the vines well free of the machine.

It is another object of the invention to provide on a potato harvesting machine an automatic holding and dropping device for the potato barrels, as they are filled with the potatoes running from a conveyor leaving the separator unit.

It is another object of the invention to provide a potato harvesting machine with a separator unit which is compact and that consumes little space upon the machine, and wherein the potatoes free of the stones and vines are received at one level and elevated by means of a rotary lifting conveyor to a discharge level where by means of a conveyor extending into the rotary conveyor will have the potatoes dumped upon it by the rotary conveyor and by continuous flow the potatoes will be moved along the upper level for deposit in the barrels and wherein the barriers for controlling the flow of air within the separating unit are of simple construction and keep air from being sucked into the separator from the discharge opening.

Other objects of the invention are to provide a potato harvesting machine with the above objects in mind which is of simple construction, the parts reduced to a minimum and arranged on a common chassis, easy to maintain, operated with a minimum crew, attachable to a tractor in pull behind fashion, long life and of rugged parts, has a single suction fan means, has an independent power plant for operating the suction fan and several conveyors employed for lifting the potatoes, the vine picking device and efficient in operation.

For other objects and for a better understanding of the invention, reference may be had to the following detailed description taken in connection with the accompanying drawing, in which:

Fig. 1 is a side elevational view of the potato harvester embodying the features of the present invention.

Fig. 2 is a rear end elevational view of the harvester.

Fig. 3 is an enlarged longitudinal sectional view of the suction air separating unit and of the conveying mechanism therein with a view being taken generally on line 3—3 of Fig. 2 and looking in the direction of the arrows thereof.

Fig. 4 is a transverse sectional view taken through the separating unit and looking rearwardly therein, the view being taken on line 4—4 of Fig. 3.

Fig. 5 is a collective and illustrative view showing in elevation the vine picking device, its location relative to the main lifting conveyor and relative to the transverse conveyor onto which the stones and potatoes are delivered on the vine picking device.

Fig. 6 is a fragmentary perspective view of the vine picking device.

Fig. 7 is a fragmentary transverse sectional view of the separating unit near the inlet and discharge openings thereof and as viewed on line 7—7 of Fig. 3.

Fig. 8 is a fragmentary transverse sectional view taken of the nose of the separating unit and as viewed on line 8—8 of Fig. 3 and in the direction of the arrows thereof.

Fig. 9 is a fragmentary longitudinal sectional view taken generally on line 9—9 of Fig. 3.

Fig. 10 is a fragmentary and top planned view of the barrel supporting and dropping mechanism.

Fig. 11 is a longitudinal sectional view taken through the barrel supporting and dropping mechanism and as viewed generally on line 11—11 of Fig. 10.

Referring now to the figures, 15 represents a frame or chassis having a transverse axle 16 to which wheels 17 and 18 are pivotly connected. The frame extends forwardly from the wheels and is balanced on the wheels as much as possible so as to eliminate the forward load. The forward part of the frame can be connected to the draw bar of a tractor so that the frame with all of the parts thereon are pulled by the tractor draw bar. The tractor draw bar has the usual fittings that can accommodate the forward end of the frame 15. Also, the power take off of the tractor can be utilized in a manner to be hereafter described for supplying power to various auxiliary devices of the harvester.

On the forward end of the frame and at one side thereof, is an adjustable digging apron that enters beneath the potato hills to lift the potatoes from the hill as the harvester is pulled over the field by the tractor. This lifting apron is indicated generally at 19. A hydraulic mechanism 20 is connected through a linkage 21 with the lifting apron to effect the adjustment of the same to the proper digging depth under the hill. This hydraulic mechanism may receive its power from a hydraulic pump on the tractor and hose connections extending from the tractor, not shown, for supplying the hydraulic mechanism 20. This mechanism 20 includes a spring return arrangement 22. A pivot shaft 23 carries the apron and is adjustable thereupon.

A main conveyor mechanism indicated generally at 24 receives the potatoes from the digging apron 19 and elevates them upwardly. Also lifted by this conveyor are the large stones which cannot penetrate or drop through the cross bars 25 of the conveyor and such vines as are accumulated. The elevating conveyor 24 has usual sides 26 and 27 as well as the cross bar travelling conveyor. The cross bar conveying belt extends into the digger 19 so that elevation of the potatoes starts from the hill level. A drive shaft 28, Fig. 5, has a driving roller 29 to effect the operation of the cross bar conveyor belt 25. This shaft 28 is driven by a pulley belt 31 that extends vertically downwardly to a driving unit or transmission 32. This transmission 32 can be powered by the tractor power take off mechanism or by a self-contained drive mechanism provided on the harvester.

As the main conveyor belt finally lifts the potatoes, stones and vines to the high elevation, a finger picking device 33 operating at high speed and having fingers 34 thereon grabs the vines as they leave the conveyor and flings them rearwardly and free of the stones and potatoes. This picking device includes a drive pulley 35 and an idler pulley 36 rearwardly spaced therefrom, Fig. 5. A belt 37 has the fingers 34 riveted by their rear ends, as indicated at 38 to the belt 37. These fingers are arranged in spaced relationship across the belt 37 and there are a plurality of transverse rows of these fingers across the belt. The forward ends of the fingers flip and move fast as they near the main conveyor in order to pick up the vines and the same action is effected as the fingers thrust the vines from the picking device at the rear end thereof.

With the vines plucked from the potatoes and stones, these potatoes and stones are free to drop onto a small conveyor belt 39 that will lower them on to a main transverse conveyor mechanism 41. The vine picking device 33 is driven by a pulley belt 42, Fig. 1, and the small conveyor 39 can be driven by a pulley belt connection, not shown, extending to the shaft 28. In the illustrations, potatoes are represented at 43. Stones are represented at 44 and vines are represented at 45.

By means of the transverse conveyor 41, the potatoes and stones are taken laterally across the harvester and under nose 46 of section separator unit 47. The conveyor mechanism 41 is shown in Fig. 8 and is elevated by a roller 48 in order to lift the potatoes into the open under side of the rearwardly extending nose 46 of the separator unit and in order to confine the air section for the lifting action of the potatoes at a centralized location within the nose. The potatoes are lifted by the air suction provided by means to be presently described, from the belt 41 and away from the stones 44. The stones 44 will continue to travel along the belt 41 and will be dropped therefrom at the side of the machine. The stones may be collected if a container is provided at this location on the machine to receive them.

On the sides of the nose 46 are adjustably connected flexible plates 51 and 52. These plates can be elevated according to the size of the stones and potatoes being received. Clamp screw means 53 secure these plates in place on the sides of the nose once they have been adjusted to the desired position. On the forward part of the frame 15 is a power plant 54 which has a drive pulley 55 that drives through belts 56, pulley 57 of shaft 58, journalled in bearing blocks 59 and 60, mounted on a casing 61. This shaft 58 drives a fan 62 to suck air from separator unit 47. The air discharges to the atmosphere through opening 63 in the casing support 61, Fig. 1. The conduit 64 is connected to the separator unit 47 and with a casing 65 surrounding the fan 62. This suction fan 62 is of heavy duty and will draw large volumes of air through the separator 47 and with such force as to lift the potatoes 43 from the transverse belt 41.

The front part of the separator casing has an opening 66 through which the potatoes are drawn inwardly. This suction pressure is sufficiently great as to bring the potatoes through this opening with sufficient clearance so that upon their being released will drop upon a small conveyor mechanism 67, lying in the rear of the separator unit and extending in an inclined manner so that the potatoes 43 will be positively elevated to a compartment 68 in which a rotary ring conveyor 69 turns.

This rotary conveyor has side plates 70 and 71 and is partitioned circumferentially about the same by transverse plates 72 to provide pockets in the conveyor by which the potatoes will be collected and so that they will be lifted as the conveyor is rotated.

The conveyor has on its outer periphery a driving ring 73 at one side thereon and another driving ring 74 at the other side thereof, Figs. 3 and 4. The rotary conveyor is supported between mounting wheels 75 and 76, arranged in pairs and supported upon floor 77 of the separator unit 47. These wheels permit the rotary conveyor to be rotated and the wheels 75 are connected to a shaft 78 which is driven by a pulley 79 from a driving unit 80. This driving unit may receive its power through the drive connection with the tractor power take off, not shown, or may take some other form wherein it can be supplied with power from the harvester power plant directly.

As shown in Fig. 9, the separator unit 47 is provided with a removable side closure plate 82 secured by fastening screws 83 to the wall of the unit. The opening in the wall upon the closure plate 82 being removed permits the insertion or removal of the rotating drum conveyor 68. Since the inclined conveyor 67 extends into the rotating drum in order that the potatoes will be deposited well within the side of the drum, it is necessary in order to locate the drum within the unit housing, to permit the rearward displacement of the drum. A vertical partition 84 closes off the forward side of the drum. This partition is removable or adjustable toward front wall 85 of the rotating drum compartment on lifting spacing plates 86 and 87. By lifting these plates the partition 84 can be longitudinally adjusted and if it is desired to remove the rotating drum from the unit, the rotating drum will move free from the end of the conveyor 67 and can slide outwardly through the opening in the side of the unit wall.

Also a spacing member 88, as shown in Fig. 9, can be provided between the adjustable partition 84 and the vertical wall 85.

In front of the opening 66 of the separating unit Fig. 3, is the chamber housing the conveyor 67 through which air is sucked from the nose 46 on lifting the potatoes into the separating unit. This air has two passages leading from the opposite sides of the compartment that houses the conveyor 67 so that upon dividing a low pressure space is provided at the center to relieve the potatoes and to allow them to drop upon the belt conveyor 67. This air separates and passes to the sides of the unit through respective passages thereat and then joins at a passage 90 at the top of the unit where it moves forwardly and thence downwardly into a front passage 91 to be taken off through the conduit 64 that leads to the fan housing 65 and thence through the discharge outlet 63 of the support 61 for the shaft bearings. Any vines 45 which have not been removed by the vine picking device 33 will be taken along with this air and finally discharged through the harvester and into the atmosphere. In the vertical passage 91 is an adjustable damper valve 92, which controls the flow of air through these passages and which may serve to regulate the amount of suction at the nose 46 of the separating unit.

It should be seen, as particularly shown and illustrated in Figs. 3 and 8, that the greatest concentration of suction pressure is at the center of the nose 46 and through the opening 66. The suction air is so distributed that the potatoes will be lifted from the transverse belt conveyor 41 and will be worked inwardly through the center of the opening 66 upon passing the opening, the air divides as above stated so that the potatoes will be allowed to drop onto the elevating conveyor 67. The paddle members 72 of the drum conveyor 68 serve as paddles to lift the potatoes in the manner shown in Fig. 4 so that they are elevated to a top location within the unit for deposit upon a discharge belt 93. The central space within the drum conveyor 68 is divided into a bottom section 93' and a top section 94 by a horizontal partition 95 that supports the potato discharge conveyor 93. Adjustable side baffles 96 and 97 formed of sheet metal and having respectively bracket brace members 98 and 99 are carried upon the horizontal baffle 95 so as to block off the passage of air through the successive potato pockets of the drum conveyor and so that air will not be drawn through the discharge passage. A horizontal baffle 101 closes off the top of this space that contains the lifting conveyor 67 and the discharge conveyor extends outwardly thereover and through a space 102 thereabove. The separating unit has a rear discharge opening 103 through which the potatoes 43 are taken by the conveyor 93. The conveyor 93 has vertical side boards 104 which confine the potatoes so that they will be delivered by the conveyor 93 to a depending chute 104' and directed to a barrel 105, carried by the dropping and barrel discharging mechanism 106 at the end of the harvester frame 15. An inspector's station, or seat, 107 is provided on the rear end of the frame 15 so that the potatoes entering the barrel 105 can be examined and so that any rocks, poor potatoes or vines that may have passed through the separating unit without being separated, which is infrequent, will not be commingled with the potatoes. These barrels can be supplied from a separate wagon travelling parallel with the potato harvester. The barrels will be deposited on the ground as they are filled.

The barrel dropping and discharging mechanism is shown in detail in Figs. 10 and 11 and comprises generally a frame 109 pivoted by bolt hinges 110 to a portion 111 of the main frame 15 of the harvester. An auxiliary frame portion 112 extends rearwardly on the main frame 15 and has a pulley shaft 113 over which a cable cord 114 extends. This cable cord 114 is connected to an arm 115, pivoted at 116 to a bracket 117. This arm is normally urged rearwardly by a tension spring 118 anchored to a bolt 119 in portion 111 of the main frame 15. When a predetermined amount of weight is collected in the barrel, the drop frame 109 will be lowered and the barrel 105 can be pushed off onto the ground. This barrel will be replaced by an empty barrel immediately so that there will be no dropping of potatoes from the machine to the ground.

It should now be apparent that there has been provided a potato harvester which will dig the potatoes and separate them from the vines and stones and place them in barrels without the human hands to touch the potatoes at any stage therealong. It will be seen that the back breaking task of labor is no longer required. It will also be seen that the great masses of labor that ordinarily enter the potato field at harvesting time will no longer be needed. It will be further apparent that by the potatoes being handled with air suction and held in suspension therein that there is little chance for these potatoes being too greatly bruised in the process of harvesting them. It will be seen that there has been provided a finger vine picking device that will remove the vines from the collection of potatoes, stones and vines and which operates in such a fashion that such vines will be positively and vigorously kicked from the harvester. It will further be seen that the separating unit is so formed with a rotating conveyor to lift the potatoes from a bottom section to the top section without leakage of the air down through the separating unit which is used to lift the potatoes from the belt and free of the stones.

While various changes may be made in the detail construction of this potato harvester, it will be seen that such changes shall be within the spirit and scope of the present invention and as defined by the appended claims.

I claim:

1. A potato separating device to separate the potatoes from stones, comprising a separator casing, an inlet conveyor operable along one side of the casing, suction head means extending over the conveyor, suction fan means connected to the casing to draw air and the potatoes from the inlet conveyor, said casing having a lower section for receiving the potatoes lifted from the inlet conveyor and passageway means extending from the lower section through the casing to the suction fan means, said casing having an upper section and baffle means separating the upper section from the lower section, inclined conveyor means for elevating the potatoes received from the inlet conveyor in the lower section of the casing, a compartmented rotatable drum adjacent to the discharge end of said inclined conveyor for receiving potatoes discharged therefrom and raising the potatoes to the upper section, and discharge conveyor means within the upper section for receiving the potatoes from said rotary drum and discharging the same from the separating device.

2. A potato separator adapted to separate potatoes from stones, a separator casing, a suction nose extending from one side of the casing, said suction nose being adapted to fit over a travelling conveyor, suction fan means connected to the casing to create a flow of air from the suction nose and to lift the potatoes free of the stones on the conveyor, a rotary drum conveyor compartment within the casing, a rotary drum operable therein, said rotary drum conveyor means having a receiving opening therein, said casing having a receiving space for receiving the potatoes from the suction nose upon the same being drawn into the casing, inclined conveyor means within said receiving space for directing the potatoes which have been received in the rotary drum compartment opening and to the rotary drum, horizontal baffle wall means for sectionalizing the space within the rotary drum conveyor compartment, said separator casing having a discharge opening therein communicating with the space in the top of the rotary conveyor compartment and discharge conveyor means entering the discharge opening of the casing and the upper section of the rotary conveyor compartment to receive the potatoes from said rotary drum and to discharge them operably of the separator.

3. A potato separator adapted to separate potatoes from stones, a separator casing, a suction nose extending from one side of the casing, said suction nose being adapted to fit over a travelling conveyor, suction fan means connected to the casing to create a flow of air from the suction nose and to lift the potatoes free of the stones on the conveyor, a rotary drum conveyor compartment within the casing, a rotary drum operable therein, said rotary drum compartment means having a receiving opening therein, said casing having a receiving space for receiving the potatoes from the suction nose upon the same being drawn into the casing, elevating means within said receiving space for directing the potatoes which have been received through the rotary drum compartment opening to the rotary drum, horizontal baffle wall means for sectionalizing the space within the rotary drum conveyor compartment, said separator casing having a discharge opening therein communicating with the space in the top of the rotary conveyor compartment and discharge conveyor means entering the discharge opening of the casing and the upper section of the rotary conveyor compartment to receive the potatoes from said rotary drum and to discharge them operably of the separator, said rotary conveying drum having side plates and paddle members, circumferentially spaced around the drum to provide pockets therein for receiving and lifting the potatoes as the drum is rotated, and said means for sectionalizing the rotary drum compartment including arcuate baffle structure conforming to the inner periphery of the rotary drum and spanning the paddle members forming one pocket, whereby to prevent the leakage of air through the pockets of the conveyor.

4. A potato separator adapted to separate potatoes from stones, a separator casing, a suction nose extending from one side of the casing, said suction nose being adapted to fit over a travelling conveyor, suction fan means connected to the casing to create a flow of air from the suction nose and to lift the potatoes free of the stones on the conveyor, a rotary drum conveyor compartment within the casing, a rotary drum operable therein, said rotary drum compartment means having a receiving opening therein, said casing having a receiving space for receiving the potatoes from the suction nose upon the same being drawn into the casing, elevating means within said receiving space for directing the potatoes which have been received through the rotary drum compartment opening to the rotary drum, horizontal baffle wall means for sectionalizing the space within the rotary drum conveyor compartment, said separator casing having a discharge opening therein communicating with the space in the top of the rotary conveyor compartment and discharge conveyor means entering the discharge opening of the casing and the upper section of the rotary conveyor compartment to receive the potatoes from said rotary drum and to discharge them operably of the separator, and said suction air passageway means through the casing having divided passageways communicating with the potato receiving space whereby the air entering the space will be divided upon entering the potato receiving space to release the potatoes.

5. A potato separator adapted to separate potatoes from stones, a separator casing, a suction nose extending from one side of the casing, said suction nose being adapted to fit over a travelling conveyor, suction fan means connected to the casing to create a flow of air from the suction nose and to lift the potatoes free of the stones on the conveyor, a rotary drum conveyor compartment within the casing, a rotary drum operable therein, said rotary drum compartment means having a receiving opening therein, said casing having a receiving space for receiving the potatoes from the suction nose upon the same being drawn into the casing, elevating conveyor means within said receiving space for directing the potatoes which have been received through the rotary drum compartment opening and into the rotary drum, horizontal baffle wall means for sectionalizing the space within the rotary drum conveyor compartment, said separator casing having a discharge opening therein communicating with the space in the top of the rotary conveyor compartment and discharge conveyor means entering the discharge opening of the casing and the upper section of the rotary conveyor compartment to receive the potatoes from the rotary drum and to discharge them operably of the separator, and said potato receiving nose over the inlet conveyor having adjustable air control members on the sides thereof to limit the flow of air and to control the suction thereof through the separator casing and damper control means in the suction air passageway for further controlling the flow of the suction air through the casing.

6. A potato separating device to separate the potatoes from stones comprising a separator casing, an inclined inlet conveyor along one side of the casing to raise and direct potatoes into the separating device, a duct protruding from said casing extending over the upper section of the inlet conveyor, suction fan means connected to the casing to induce a draft through the casing and duct and to raise the potatoes from the inlet conveyor, a second conveyor extending transversely from said inlet conveyor for receiving potatoes therefrom raised by said suction fan means, a rotatable compartmented drum having a potato receiving inlet adjacent the discharge end of the second conveyor, means to rotate said drum vertically, a third conveyor for discharging the potatoes from the separating device and projecting from within said rotatable drum for receiving potatoes falling from the compartmented drum as the drum is rotated, said casing enclosing the rotatable drum, and the second conveyor and a portion of said third conveyor positioned relative to each other so as to form a passageway for flow of air for removal of separated deleterious matter from said potatoes.

References Cited in the file of this patent

UNITED STATES PATENTS

| | | |
|---|---|---|
| 544,156 | Clark | Aug. 6, 1895 |
| 1,008,914 | Horst | Nov. 14, 1911 |
| 1,298,086 | Pallansch | Mar. 25, 1919 |
| 1,351,948 | Fowler | Sept. 7, 1920 |
| 1,876,150 | Pearson | Sept. 6, 1932 |
| 2,215,516 | Schooler | Sept. 24, 1940 |
| 2,253,797 | Melroe | Aug. 26, 1941 |
| 2,294,086 | Hinds et al. | Aug. 25, 1942 |
| 2,446,646 | Forrest | Aug. 10, 1948 |
| 2,448,446 | LaPointe | Aug. 31, 1948 |
| 2,468,639 | Sample | Apr. 26, 1949 |
| 2,482,160 | Donogh | Sept. 20, 1949 |
| 2,535,801 | LaPointe | Dec. 26, 1950 |
| 2,559,965 | Innes | July 10, 1951 |
| 2,601,855 | Johnson | July 1, 1952 |

OTHER REFERENCES

American Miller and Processor, March 1944, pages 33 and 34.